Feb. 9, 1960
E. L. CALLAHAN
2,924,022
ROTARY INDICATORS
Original Filed Feb. 28, 1947
2 Sheets-Sheet 1
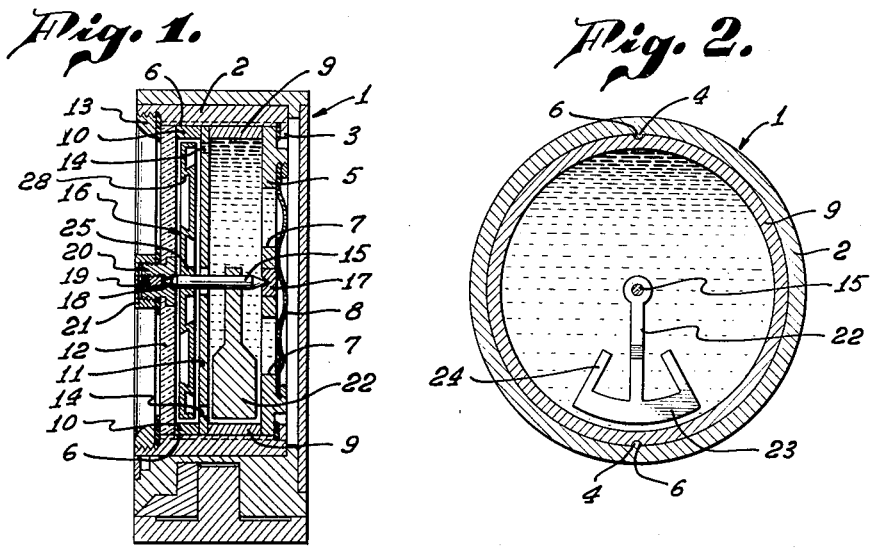
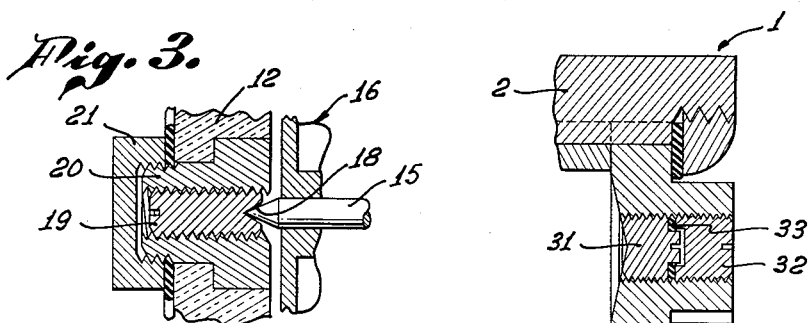
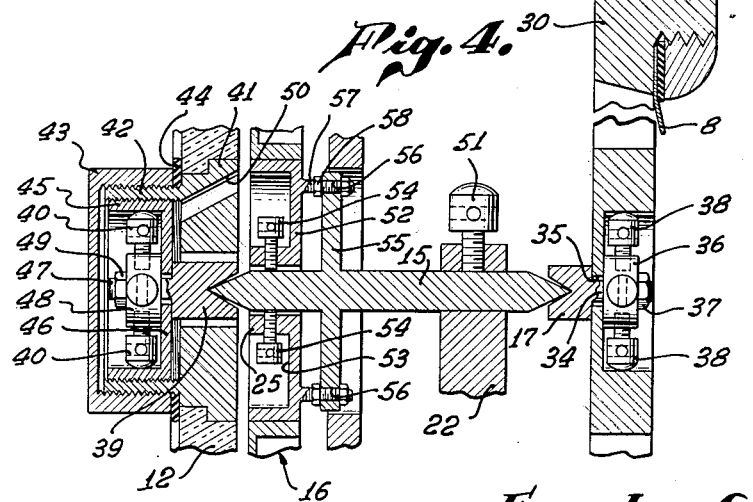
INVENTOR.
*Ezra Leo Callahan;*
BY
*J. Calvin Brown,*
ATTORNEY.

Feb. 9, 1960 E. L. CALLAHAN 2,924,022
ROTARY INDICATORS
Original Filed Feb. 28, 1947 2 Sheets-Sheet 2
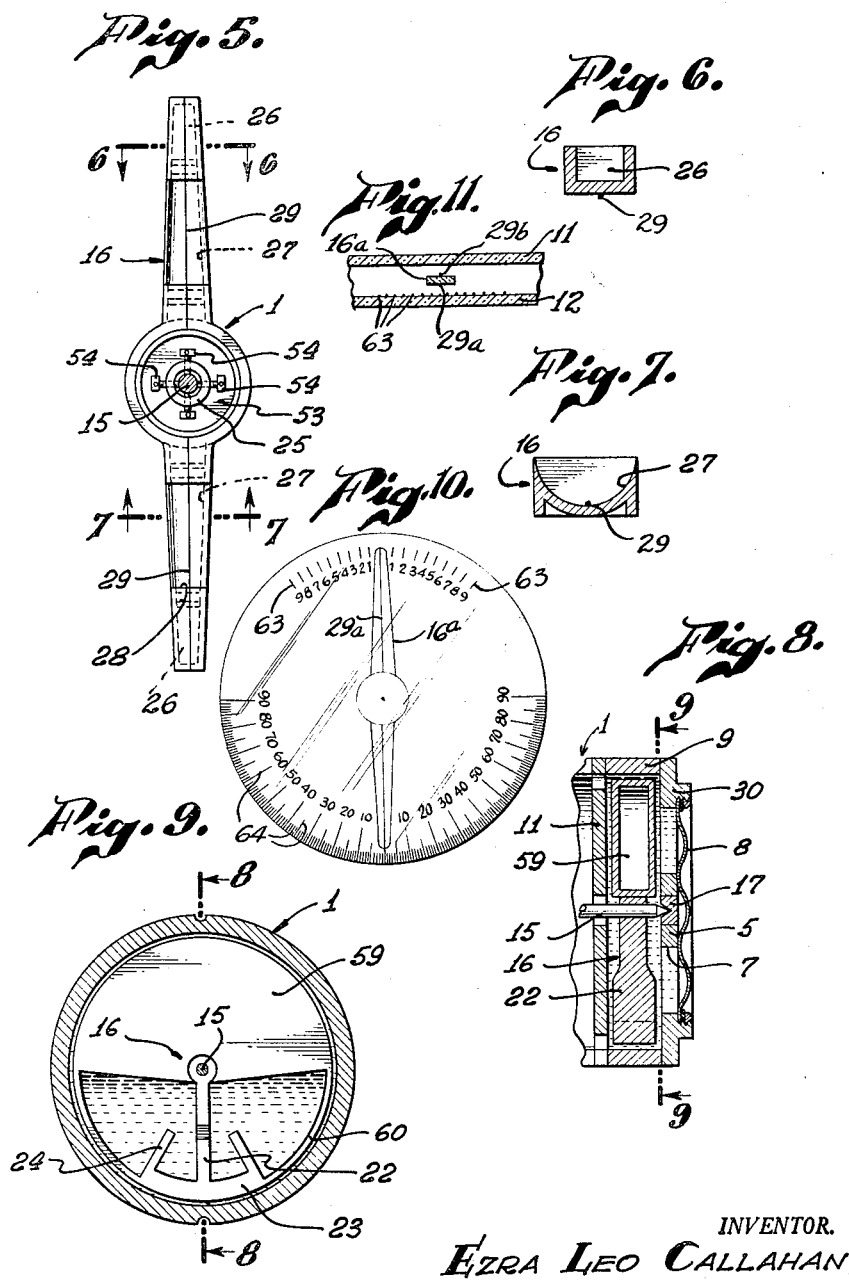
INVENTOR.
EZRA LEO CALLAHAN;
BY
ATTORNEY.

United States Patent Office 2,924,022
Patented Feb. 9, 1960

2,924,022
ROTARY INDICATORS
Ezra Leo Callahan, Inglewood, Calif.

Original application February 28, 1947, Serial No. 731,672, now Patent No. 2,659,976, dated November 24, 1953. Divided and this application October 5, 1953, Serial No. 384,082

6 Claims. (Cl. 33—220)

The present application is a divisional of my application for Slope Levels, filed February 28, 1947, Serial No. 731,672, now Patent 2,659,976 dated November 24, 1953.

An object of the invention is the provision of a rotary indicator for ascertaining and delineating the angles of slopes and bevels, testing and establishing levels, and for other purposes, and primarily adapted for use by carpenters, engineers, general contractors, construction foremen, mechanics, architects, and others whose work requires predetermined angles.

The present device contemplates a needle adapted to move over a scale for giving a reading, the scale varying in accordance with use of the invention, and a further object contemplates the provision of means whereby any oscillation of the needle is reduced to a minimum or quickly damped.

A further object is the provision of means so constructed and arranged as to assure an accurate reading between a needle device and its position relative to a scale.

A further object contemplates a device wherein a needle is utilized, together with means for mounting the needle relative to a scale, the arrangement being such that frictional losses due to the needle mounting are reduced to a minimum, to the end that accurate needle readings may be obtained.

Other objects include a rotary indicator which is inexpensive in cost of manufacture, accurate in operation, and generally superior to indicators now known to the inventor.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 1 is a vertical sectional view of one form of rotary indicator contemplated by the present invention, omitting the portion of the damping liquid just behind the front glass plate which carries scales, Figure 2 is a transverse sectional view of the rotary indicator shown in Figure 1, and depicting particularly the construction of a pendulum weight and fins associated therewith by which the indicator is actuated, Figure 3 is an enlarged fragmentary sectional view of means for adjusting one of the bearings shown in Figure 1, Figure 4 is a fragmentary sectional view of a modified form of rotary indicator, Figure 5 is an enlarged front elevation of the indicator needle, Figure 6 is a sectional view on the line 6—6 of Figure 5, Figure 7 is a sectional view on the line 7—7 of Figure 5, Figure 8 is a transverse sectional view of a further modified device on the line 8—8 of Figure 9, and, Figure 9 is a vertical sectional view on the line 9—9 of Figure 8.

Figure 10 is a front view of the dial plate but showing a simplified plate glass indicator needle behind it, Figure 11 is a vertical section through the plate and needle of Figure 10.

Referring now with particularity to the drawings, the indicator 1 comprises a circular casing 2 supported within a suitable housing of some character, such as illustrated in the application for patent, of which the present application is a division. The casing 2 is formed with an inwardly directed flange 3 at its rearward end, and a pair of diametrically-opposed guide ribs 4 within its bore parallel to the axis of the casing. The back of casing 2 comprises a circular plate 5, the marginal edge of which bears against the flange 3. Diametrically-opposed grooves 6 in the periphery of plate 5 receive the guide ribs 4 which function to key the plate 5 and outer casing 2 together against relative rotative movement. The plate is formed with a plurality of openings 7 therein arranged circuitously about its axis to permit the flow of a clear heavy liquid with which the casing is filled, to opposite sides of the plate. Across the back surface of plate 5 is a diaphragm 8 provided with annular corrugations, and preferably composed of copper, its edge being secured firmly by suitable means to the plate so as to retain the bulk of the liquid within the casing forward of the plate but to relieve, by its expansion and contraction, variations in pressure of the liquid within the casing which may be induced by changes in temperature. Fitted snugly within the bore of the casing 2 is a pair of annular lining members 9 and 10, similarly keyed by ribs 4 to the outer casing. Between the members 9 and 10 the marginal circular edge of a disk 11 is clamped. A glass plate 12 extends across the outer edge of the lining member 10 and is sealed with the bore of the casing by a gasket and ring nut assembly 13. Ribs 4 engage in complementary grooves 6 formed in the periphery of both disk 11 and plate 12 to hold the same against rotative movement. 14 indicates a series of holes formed in disk 11 for the unrestricted flow of the liquid throughout the casing.

Journalled axially in casing 2 is a shaft 15 upon which the hub of needle 16 is mounted. One end of shaft 15 is conical for reception by a conical bearing 17 mounted axially in the back plate 5. The angle of the conical walls of bearing 17 is slightly greater than the angle of the complementary end of the shaft 15, whereby the shaft contacts the bearing only at its extreme tip. Shaft 15 projects through an opening in disk 11 and terminates in a pointed end journalled in a conical bearing 18 (Figure 3) of wider angle, formed in the end of a screw 19. The screw is threaded into a flanged collar 20 clamped in an axial hole in the glass plate 12 by a nut 21. It will be noted that by rotating the screw 19 the bearings 17 and 18 may be critically adjusted to insure a minimum of friction upon shaft 15. The needle 16 mounted upon shaft 15 is accordingly free to rotate behind the dial in response to gravitation of a pendulum weight 22 suspended from shaft 15 intermediate the back plate 5 and disk 11. The pendulum 22 comprises a shank through the upper end of which shaft 15 extends, and an arcuate section 23 (Figure 2) connected to the lower end of the shank for suspension in close proximity to the inner surface of the adjacent lining member 9. Each end of the section 23 is formed with an upstanding fin 24 disposed in a radial plane of casing 2. Fins 24 function to retard the swing of the pendulum in the liquid contents of the casing and minimize oscillation of the needle 16 when positioning the device relative to the work.

Needle 16 comprises a hub 25 having a pair of diametrically-opposed radially-projecting channels 26 (Figure 6) composed of any suitable material. Intermediate the ends of each channel 26, the back of the channel is arcuately depressed (see Figure 7) so as to form a light-collecting concavity 27, the bottom of which extends, at each end, beneath the bottom of the adjoining section of the channel, as indicated at 28 in Figure 1 and Figure 5. An index line 29 is delineated in the middle of each channel 26, so as to coincide with a diameter of the casing and play across a dial marked on the inner surface of glass plate 12. The concave offset 27 of part of each channel 26 with respect to the plane of the back of the channel at the ends of the latter enables more accurate reading of the dial by obviating the parallax due to the necessary displacement of the needle 16 from the face of the dial. It will be apparent that the displacement of the reaches of the index line upon the outer flat surface of the channel and the concave, depressed surface thereof results in parallax which will be obvious to the user when the index line is viewed from a lateral oblique angle. If viewed from a point directly in front of the dial, as is necessary for accurate reading, the index line on the relatively offset surfaces of the needle appears to be unbroken and will be accurately aligned with the proper calibrations of the dial. The extension 28 of the concave portion 27 of each channel 26 beneath the flat portion thereof assures the appearance of an unbroken index line to the user viewing the device from directly above or below the indicator needle. The dial upon the inner face of plate 12 of the rotary indicator 1 includes one or more scales graduated in any manner desired, such as in degrees with which one end of the needle is adapted to register, while an opposite arc on the plate may be calibrated in rise per foot, whereby both the degree of inclination and the slope per foot of the work may be coincidentally determined.

In Figure 4, I have illustrated a modified form of indicator assembly embodying mechanism for critically adjusting the disposition of the bearings for the needle shaft 15. The back plate 30 is formed with an opening in the upper arc thereof through which the casing 2 is filled with liquid, it being desirable to completely displace all air from the casing by the liquid so as to obviate the formation of bubbles which might otherwise interfere with the reading of the dial. The opening is normally sealed by threaded plugs 31 and 32, there being an annular sealing gasket 33 therebetween. Pressure on the liquid is adjusted by moving plug 31 and then locking the latter in place by plug 32.

The shank of a shaft bearing 34 projects through an axial opening 35 in the plate 30 which is countersunk to accommodate a retaining ring 36 snugly encircling the shank. A nut 37 threaded on the end of the bearing shank clamps the bearing 34 and ring 36 to plate 30 so as to prevent axial movement of the bearing. Lateral adjustment of the bearing is provided by four screws 38 threaded radially into the ring 36 with their heads bearing against the annular wall of the countersunk portion of opening 35. As the shank of shaft bearing 34 is diametrically smaller than opening 35 in plate 30 through which it extends, variation in the threaded adjustment of the screws 38, relative to one another, is effective to shift the bearing and the end of the shaft 15, rotatably supported thereby, laterally so as to assist in effecting absolute alignment of the index line 29 marked on needle 16 with some reference calibration of the dial.

The opposite conical end of shaft 15 is supported in a bearing 39 of the kind hereinabove described, which in this embodiment comprises a circular block supported in the center of the glass plate 12 by a series of screws 40 in a manner analogous to the supporting means for the rearward end of the shaft. An annular collar 41 having a rabbeted edge is fitted into a complementary axial opening in the glass plate 12, and is formed with a rim 42 which projects through the plate for threaded attachment of a cap 43. A gasket 44 interposed between the cap 43 and plate 12, permits the formation of a liquid-tight seal between collar 41 and plate 12. The bore of rim 42 is threaded for reception of a liner 45 having an inwardly-directed annular flange 46. Integral with the bearing 39 is a stem 47 which projects through the bore of flange 46 and into liner 45. A sleeve 48, snugly fitted on stem 47, is clamped rigidly against the flange 46 of liner 45 by a nut 49 so as to obviate axial movement of the bearing 39 with respect to the liner. The bearing may be adjusted laterally by the screws 40 threaded radially into sleeve 48 in equi-spaced relationship with their heads contacting the bore of liner 45. By varying the threaded extension of screws 40 into sleeve 48 relative to one another, the stem 47 and bearing 39 may be variably supported to assure perfect alignment of the adjacent end of the shaft with the axis of the casing assembly. It will be observed that by rotation of liner 45, the bearing 39 may be shifted axially relative to bearing 34. A hole 50 formed in collar 41 permits the flow of the liquid contents of the casing around the bearing and allows the air to escape.

To further assist in effecting the proper alignment of needle 16, a set screw 51 is threaded through the upper end of pendulum 22 to engage shaft 15 and thereby lock these elements in pre-adjusted proper position.

Needle 16 of the embodiment of Figure 4 is provided with a hub 52 having a bore somewhat larger than shaft 15 to permit sufficient play for its critical lateral adjustment upon the shaft, as about to be explained. An annular coaxial groove 53 is formed in hub 52 to accommodate the heads of four screws 54 threaded through the circular wall between the groove 53 and bore of hub 52 so as to abut against the shaft and variably support the needle in proper relationship with the dial for most accurate reading. The relationship between the needle and shaft is reinforced by a disk 55 integral with shaft 15 and disposed in an axial opening in the disk 11. A series of holes 56 equi-spaced around the marginal edge of disk 55 are adapted to receive diametrically-smaller threaded pins 57 projecting rearwardly from hub 52 of the needle 16. Nuts 58 threaded on each pin 57 are effective to clamp the hub and needle in a plane perpendicular to the axis of shaft 15, or variously as specific adjustments are desired.

In Figures 8 and 9, I have illustrated a modified form of rotary indicator wherein the needle 16 is maintained in a normal position by the action of both a pendulum weight and a float or buoy. The pendulum 22 is of substantially the same construction as hereinabove described. The upper end of the shank of the pendulum is fitted snugly to shaft 15 intermediate the disk 11 and back plate 30. The casing assembly is provided with liner 9, and, being otherwise identical with the construction hereinabove referred to, is not further described. The pendulum weight 22 is equipped with fins 24 to resist movement through the liquid with which the case is filled so as to dampen oscillation of needle 16. Connected integrally with the upper end of the shank of pendulum weight 22 is a float 59 comprising a sealed chamber, the upper wall of which conforms in contour and extends in close proximity to the inner surface of the liner 9. The bottom of float 59 is connected to the arcuate section 23 of the pendulum 22 by a pair of strips 60 which correspondingly follow the contour of the lower arc of the inner surface of liner 9 to assure greater rigidity in the needle-actuating assembly.

An important feature of the embodiment of Figures 8 and 9 resides in the combination of a float and weight, structurally opposed but functionally supplementary to one another; wherein the buoyancy of float 59 is substantially equal to the weight of the assembly, i.e., to the weight of float 59, pendulum 22, strips 60, shaft 15 and needle 16, so as to minimize and in fact substantially eliminate friction upon bearings 17 and 18, which, accordingly, serve merely, in this embodiment, primarily as guides. The float 59 as shown is about one-half of a cylinder, the radial sides forming an obtuse angle of nearly 180°. The weight 23, the arcuate strips 60 and the float 59 are preferably integral.

The operation, uses and advantages of the invention just described are as follows:

The construction of the needle is such as to permit it to be made as a stamping which materially reduces expense in manufacture. The arrangement of the reflecting portions 27 with respect to the tip portions 26 breaks the index line 29. Hence, unless the needle is viewed from the front or from the ends, the index line will appear broken. The viewer, therefore, must observe the needle with respect to the dial and the graduations thereon in such a manner that the index line appears unbroken and straight. This adds to the accuracy of the reading of the instrument. If the scales used on glass plate 12 indicate degrees, zero indication would be on a perpendicular line when the entire indicator is standing vertically with the index line of the needle cutting the zero indications. Obviously, any tipping of the device to which said indicator is attached would be immediately shown by the position of the index line of the needle relative to said indications. The present device could be used as a gradometer or inclinometer with the scales arranged in degrees per 100 feet of grade or climb. In such a device, the needle should not oscillate but maintain its vertical position regardless of the tipping of the casing, and the present construction for the pendulum is such as to reduce any oscillation of the pendulum and the needle to a minimum. The construction shown in Figure 2 provides for dampening fins 24 which resist oscillation of the pendulum as said pendulum is surrounded by a liquid. Actual tests on the device depicted in Figures 8 and 9 has shown that violent agitation of the casing, as well as rapid turning thereof, has little effect upon the pendulum, the pendulum remaining in its vertical position. This is attributed to the fact that the pendulum carries the fins which with the radial sides of the float resist movement, together with the fact that a float is provided. This float lifts the pendulum, and in such a manner that there is very little friction in the bearings.

The plugs 31 and 32 afford a convenient means for filling the casing 2 with a liquid, and slightly compressing the liquid. The gasket arrangement between the two plugs assures a fluid-tight engagement between the plugs and the casing.

The needle 16 can be made of plate glass with an index line on each face. This is shown in Figures 10 and 11, the needle being numbered 16a and the index lines 29a and 29b respectively. The scales previously mentioned are illustrated in Figure 10, the upper scale 63 being rise in 12 and the lower scale 64 being in degrees. These scales are on the rear face of the plate 12 so as to be nearer to the index line 29a on the plate glass needle 16a or index line 29 on the forward face of the base of channel 26 of indicator needle 16. When viewed from an angle, two lines are visible. When viewed directly in front, as required for accurate reading, one line only is visible. Thus, parallax is eliminated in reading the dial.

I claim:

1. In a device of the character described, a casing having a transparent dial panel, a pair of bearings within said casing, a shaft having its ends journalled in said bearings, respectively, a needle carried by said shaft having portions thereof offset with respect to one another in the plane of said shaft and bearing an index line extending longitudinally thereof and across the relatively offset portions of said needle, means to shift said needle radially and axially of said shaft, and means to shift said bearings radially and axially of said casing relative to one another, a weight secured to and suspended from said shaft to normally maintain the index line of said needle in a pre-determined angular relationship with a horizontal plane, and a liquid dampener within said casing to minimize oscillation of said weight.

2. In a device of the character disclosed, a casing having a transparent dial panel, a needle, and means mounting said needle in said casing, for movement relative to the dial panel, said needle having portions thereof offset with respect to one another and bearing an index line extending longitudinally thereof and across the relatively offset portions of said needle.

3. In needle construction for rotary indicators, said needle having portions offset with respect to one another, and bearing an index line extending longitudinally thereof and across the relatively offset portions.

4. In needle construction for rotary indicators, said needle having portions offset with respect to one another, and bearing an index line extending longitudinally thereof and across the relatively offset portions, one of said offset portions being provided with a reflecting surface.

5. In a rotary indicator, a casing provided with a circular side wall, a transparent end wall and a perforated end wall joined with the side wall, a circular diaphragm with annular corrugations secured at its edge to the perforated end wall and adapted to bow away from said wall, said casing adapted to receive a liquid between the transparent end wall, the diaphragm and the side wall and on both sides of the perforated end wall, an axial shaft pivoted in bearings within said casing, one of the said bearings being mounted in said perforated end wall, a float diametrically opposed to said weight and of a size to provide a buoyancy sufficient to offset the weight of said shaft assembly so as substantially to eliminate friction of said shaft in said bearings, a needle carried by said shaft, said shaft having a weighted end portion provided with a pair of inwardly extending radial fins for damping oscillation of the needle within the liquid, the said diaphragm moving in accordance with temperature change of the liquid within the casing, adjustable means for compressing the liquid in the casing, a plug for locking said last-mentioned means in adjusted position, and a gasket between the plug and the adjustable means.

6. In a rotary indicator, a casing, a shaft pivoted within the casing, a weight having a fin at each side radial with respect to the axis of the shaft, secured to the shaft to act as a pendulum, an indicator connected to the shaft to assume a chosen position with respect to the casing when the weight is at rest, a semi-cylindrical float secured to the shaft opposite the weight, said float being of a buoyancy that when the shaft with its weight and float are immersed in a liquid of appropriate gravity the friction between the shaft and its bearings approximates a minimum and the moving parts are substantially weightless as they move about their fixed axis, and arcuate strips joining the float and the weight so the periphery of the unit of float and weight is an unbroken cylinder, said casing having a cylindrical portion enclosing the liquid in which the shaft, the weight and the float means are immersed, the weight carries radial fins, said float occupying the major portion of that part of the casing which lies above the shaft whereby to act with the fins to dampen the oscillation of the shaft under the pendulum action of the weight.

References Cited in the file of this patent

UNITED STATES PATENTS

| | | |
|---|---|---|
| 482,026 | Rider | Sept. 6, 1892 |
| 1,282,095 | McArdle | Oct. 22, 1918 |
| 2,192,148 | Otto | Feb. 27, 1940 |
| 2,202,154 | Kollsman | May 28, 1940 |
| 2,211,201 | Fell | Aug. 13, 1940 |
| 2,317,182 | Dickson et al. | Apr. 20, 1943 |
| 2,652,627 | Vickery | Sept. 22, 1953 |
| 2,659,976 | Callahan | Nov. 24, 1953 |

FOREIGN PATENTS

| | | |
|---|---|---|
| 20,056 | Great Britain | Sept. 10, 1896 |
| 436,863 | France | Feb. 3, 1912 |